(12) United States Patent
Lee et al.

(10) Patent No.: US 10,757,711 B2
(45) Date of Patent: Aug. 25, 2020

(54) VEHICLE TERMINAL AND OPERATION METHOD THEREOF

(71) Applicant: LG ELECTRONICS INC., Seoul (KR)

(72) Inventors: Yonghwan Lee, Seoul (KR); Ahyoung Shin, Seoul (KR); Jongyeop Lee, Seoul (KR); Kihyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/595,947

(22) Filed: Oct. 8, 2019

(65) Prior Publication Data

US 2020/0045687 A1 Feb. 6, 2020

(30) Foreign Application Priority Data

Sep. 23, 2019 (KR) .................. 10-2019-0116634

(51) Int. Cl.
| | | |
|---|---|---|
| *H04W 74/00* | (2009.01) | |
| *H04W 72/04* | (2009.01) | |
| *H04W 4/48* | (2018.01) | |
| *H04W 72/08* | (2009.01) | |
| *H04W 28/24* | (2009.01) | |
| *H04W 4/029* | (2018.01) | |
| *H04M 1/725* | (2006.01) | |

(52) U.S. Cl.
CPC ......... *H04W 72/048* (2013.01); *H04W 4/029* (2018.02); *H04W 4/48* (2018.02); *H04W 28/24* (2013.01); *H04W 72/085* (2013.01); *H04M 1/72519* (2013.01); *H04M 1/72522* (2013.01)

(58) Field of Classification Search
CPC ..... H04W 72/048; H04W 4/48; H04W 4/029; H04W 28/24; H04W 72/085; H04M 1/72519; H04M 1/72522
USPC ................ 455/452.2, 550.1, 556.1; 340/10.3
See application file for complete search history.

(56) References Cited

U.S. PATENT DOCUMENTS

| 9,913,143 | B1 * | 3/2018 | Roche .................. H04W 12/08 |
|---|---|---|---|
| 2007/0050117 | A1 * | 3/2007 | Kitzler ................. A01B 69/008 701/50 |
| 2016/0066505 | A1 * | 3/2016 | Bakke ..................... H04W 4/70 700/275 |
| 2016/0132705 | A1 * | 5/2016 | Kovarik ............. G06K 7/10376 340/10.3 |
| 2017/0086049 | A1 * | 3/2017 | Vrzic .................... H04L 45/306 |
| 2017/0274737 | A1 * | 9/2017 | Delaruelle ......... B60H 1/00764 |
| 2017/0307396 | A1 * | 10/2017 | So ...................... G01C 21/3484 |
| 2018/0126901 | A1 * | 5/2018 | Levkova ................. B60Q 9/00 |

(Continued)

FOREIGN PATENT DOCUMENTS

KR 10-2019-0048893 5/2019

*Primary Examiner* — Danh C Le
(74) *Attorney, Agent, or Firm* — Fish & Richardson P.C.

(57) ABSTRACT

Disclosed is a method for identifying a network resource to be allocated to at least one application in a scheduled driving route based on information on a communication state of the scheduled driving route and Quality of Service (QoS) requirement for the at least one application, and a vehicle terminal for the same. In the present disclosure, one or more of a vehicle, a vehicle terminal, and an autonomous vehicle may be associated with an artificial intelligence (AI) module, an unmanned aerial vehicle (UAV), a robot, an augmented reality (AR) device, a virtual reality (VR) device, a 5G service device, etc.

18 Claims, 18 Drawing Sheets

(56) References Cited

U.S. PATENT DOCUMENTS

2019/0023556 A1* 1/2019 Wu .................... G01C 21/3469
2020/0004257 A1* 1/2020 Kim .................... G05D 1/0088

* cited by examiner

| Application | Bandwidth(1~5) | Latency(sec) | Real-time | Priority(1~5) |
|---|---|---|---|---|
| First Application | 5 | 10 sec | No | 4 |

~1210

VEHICLE TERMINAL AND OPERATION METHOD THEREOF

CROSS-REFERENCE TO RELATED APPLICATION

This application claims the benefit of Korean Patent Application No. 10-2019-0116634, filed on Sep. 23, 2019, the disclosure of which is incorporated herein in its entirety by reference.

BACKGROUND

1. Field

The present disclosure relates to a vehicle terminal and an operation method thereof, and more particularly to a method for identifying a network resource to at least one application based on information on a communication state of a scheduled driving route and a vehicle terminal for the same.

2. Description of the Related Art

There are increasing applications installed in a vehicle to operate through communication with an external server or an external Cloud. Accordingly, a communication state of the vehicle may change from time to time while the vehicle drives. In order to provide services using applications more smoothly, it is necessary to provide network resources to the applications more effectively.

In addition, an autonomous vehicle refers to a vehicle having an autonomous driving device embedded therein, the device which is capable of recognizing an environment in the surrounding of the vehicle and a state of the vehicle and controlling driving of the vehicle according thereto. Along with researches on the autonomous vehicle, researches on various services for providing user convenience by use of an autonomous vehicle are being conducted.

SUMMARY

An aspect provides a vehicle terminal and an operation method thereof. The technical objects of the present disclosure are not limited to the above-mentioned technical objects, and other technical objects that are not mentioned will be clearly understood by those skilled in the art through the following descriptions.

According to an aspect, there is provided an operation method of a terminal of a vehicle, the method including acquiring information on a communication state of a scheduled driving route of the vehicle, and Quality of Service (QoS) requirement information for each of at least one application; identifying a network resource to be allocated to the at least one application in the scheduled driving route based on the acquired information; and controlling an operation of the at least one application based on the identification.

According to another aspect, there is provided a terminal of a vehicle, comprising: an interface configured to acquire information on a communication state of a scheduled driving route and Quality of Service (QoS) requirement information for each of at least one application; and a controller configured to, based on the acquired information, identify a network resource to be allocated to the at least one application on the scheduled driving route, and control an operation of the at least one application based on the identification.

According to yet another aspect, there is provided a non-volatile computer readable recording medium in which a program for implementing the aforementioned method is recorded.

Details of other embodiments are included in the following description and the accompanying drawings.

According to the present disclosure, a terminal may acquire information on a communication state of a scheduled driving route and thereby identify a network resource to be allocated to at least one application in the scheduled driving route, and therefore, latency or interruption of a service provided through the at least one application may be prevented. In addition, the terminal is allowed to identify or determine in advance a network resource to be allocated to the at least one application in the scheduled driving route, and thus, when latency or interruption of a service provided through the at least one application is predicted, the latency or interruption of the service may be notified to a user.

In addition, the terminal is allowed to control driving of a vehicle based on information on a communication state of the scheduled driving route, and therefore, latency or interruption of a service provided through an application may be prevented or time of the latency or interruption of the service may be minimized.

Effects of the present disclosure are not limited to the aforementioned effects, and other unmentioned effects will become apparent to those having ordinary skill in the art from the claims.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
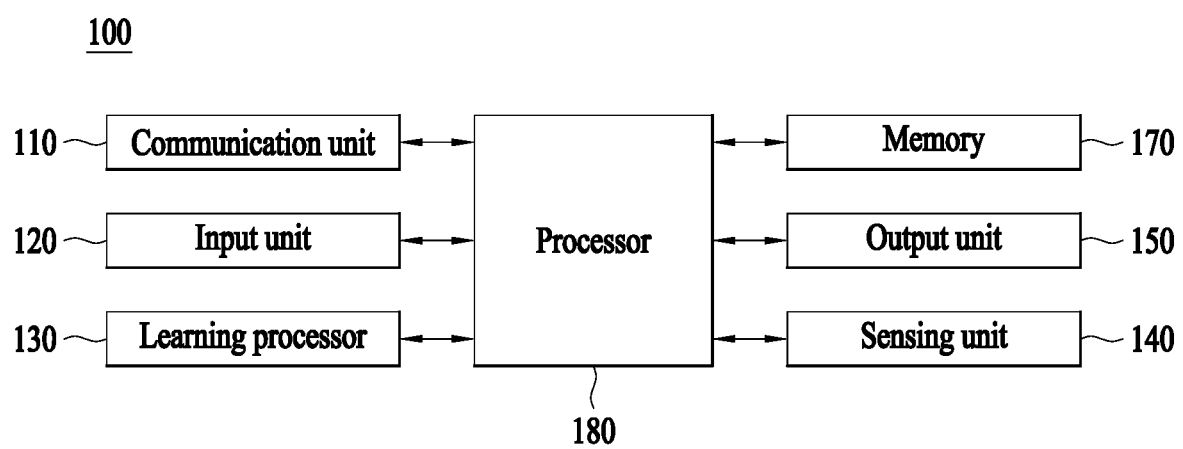
FIG. 1 shows an artificial intelligence (AI) device according to an embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

The terms used in the embodiments are selected, as much as possible, from general terms that are widely used at present while taking into consideration the functions obtained in accordance with the present disclosure, but these terms may be replaced by other terms based on intentions of those skilled in the art, customs, emergency of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

In addition, in this specification, "artificial Intelligence (AI)" refers to the field of studying artificial intelligence or a methodology capable of making the artificial intelligence, and "machine learning" refers to the field of studying methodologies that define and solve various problems handled in the field of artificial intelligence. The machine learning is also defined as an algorithm that enhances performance for a certain operation through a steady experience with respect to the operation.

An "artificial neural network (ANN)" may refer to a general model for use in the machine learning, which is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output the value of an activation function concerning signals input through the synapse, weights, and deflection thereof.

The model parameters refer to parameters determined by learning, and include weights for synaptic connection and deflection of neurons, for example. Then, hyper-parameters refer to parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function may be used as an index for determining an optimal model parameter in a learning process of the artificial neural network.

The machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by the artificial neural network when learning data is input to the artificial neural network. The unsupervised learning may refer to a learning method for the artificial neural network in the state in which no label for learning data is given. The reinforcement learning may refer to a learning method in which an agent defined in a certain environment learns to select a behavior or a behavior sequence that maximizes cumulative compensation in each state.

The machine learning realized by a deep neural network (DNN) including multiple hidden layers among artificial neural networks is also called deep learning, and the deep learning is a part of the machine learning. In the following description, the machine learning is used as a meaning including the deep learning.

In addition, in this specification, a vehicle may be an autonomous vehicle. "Autonomous driving" refers to a self-driving technology, and an "autonomous vehicle" refers to a vehicle that performs driving without a user's operation or with a user's minimum operation. In addition, the autonomous vehicle may refer to a robot having an autonomous driving function.

For example, autonomous driving may include all of a technology of maintaining the lane in which a vehicle is driving, a technology of automatically adjusting a vehicle speed such as adaptive cruise control, a technology of causing a vehicle to automatically drive in a given route, and a technology of automatically setting a route, along which a vehicle drives, when a destination is set.

Here, a vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, embodiments of the present disclosure will be described in detail with reference to the drawings.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, AI device 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), (5th Generation Mobile Telecommunication)(5G), wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
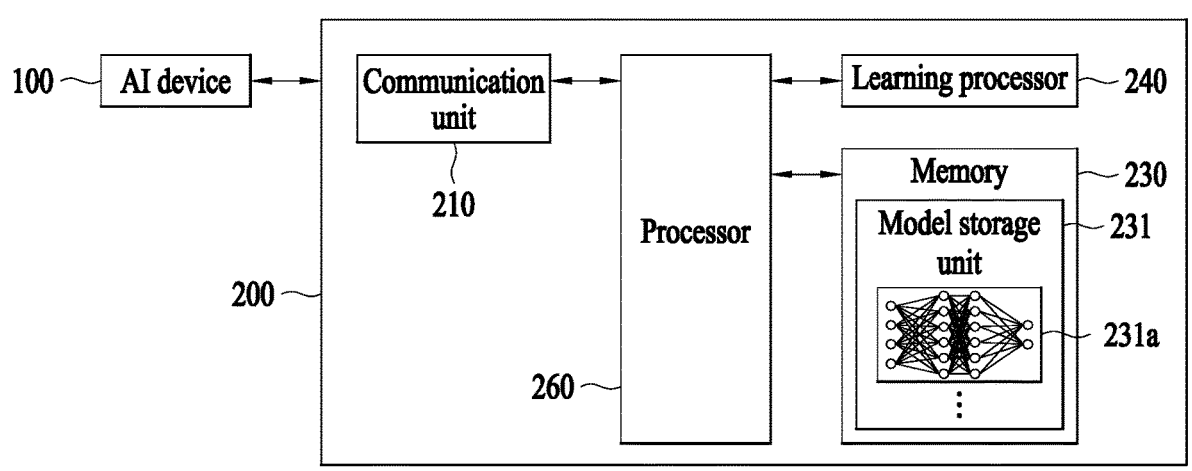
FIG. 2 shows an AI server according to an embodiment.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
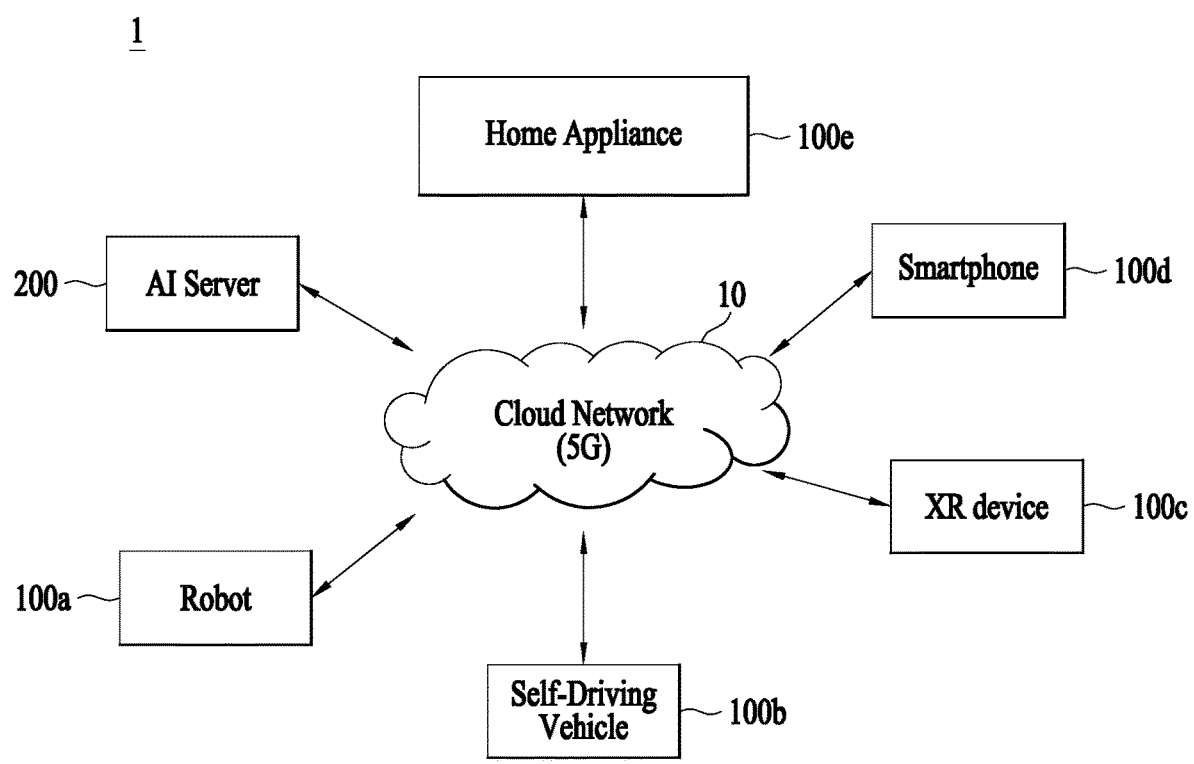
FIG. 3 shows an AI system according to an embodiment.

FIG. 3 illustrates an AI system 1 according to an embodiment of the present disclosure.

Referring to FIG. 3, in AI system 1, at least one of AI server 200, a robot 100a, a self-driving vehicle 100b, an XR device 100c, a smart phone 100d, and a home appliance 100e is connected to a cloud network 10. Here, robot 100a, self-driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, self-driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Self-driving vehicle 100b may be realized into a mobile robot, a vehicle, or an unmanned air vehicle, for example, through the application of AI technologies.

Self-driving vehicle 100b may include an autonomous driving control module for controlling an autonomous driving function, and the autonomous driving control module may mean a software module or a chip realized in hardware. The autonomous driving control module may be a constituent element included in self-driving vehicle 100b, but may be a separate hardware element outside self-driving vehicle 100b so as to be connected to self-driving vehicle 100b.

Self-driving vehicle 100b may acquire information on the state of self-driving vehicle 100b using sensor information acquired from various types of sensors, may detect (recognize) the surrounding environment and an object, may generate map data, may determine a movement route and a driving plan, or may determine an operation.

Here, self-driving vehicle 100b may use sensor information acquired from at least one sensor among a LIDAR, a radar, and a camera in the same manner as robot 100a in order to determine a movement route and a driving plan.

In particular, self-driving vehicle 100b may recognize the environment or an object with respect to an area outside the field of vision or an area located at a predetermined distance or more by receiving sensor information from external devices, or may directly receive recognized information from external devices.

Self-driving vehicle 100b may perform the above-described operations using a learning model configured with at least one artificial neural network. For example, self-driving vehicle 100b may recognize the surrounding environment and the object using the learning model, and may determine a driving line using the recognized surrounding environment information or object information. Here, the learning model may be directly learned in self-driving vehicle 100b, or may be learned in an external device such as AI server 200.

At this time, self-driving vehicle 100b may generate a result using the learning model to perform an operation, but may transmit sensor information to an external device such as AI server 200 and receive a result generated by the external device to perform an operation.

Self-driving vehicle 100b may determine a movement route and a driving plan using at least one of map data, object information detected from sensor information, and object information acquired from an external device, and a drive unit may be controlled to drive self-driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, self-driving vehicle 100b may perform an operation or may drive by controlling the drive unit based on user control or interaction. At this time, self-driving vehicle 100b may acquire interactional intention information depending on a user operation or voice expression, and may determine a response based on the acquired intention information to perform an operation.

Figure 4:
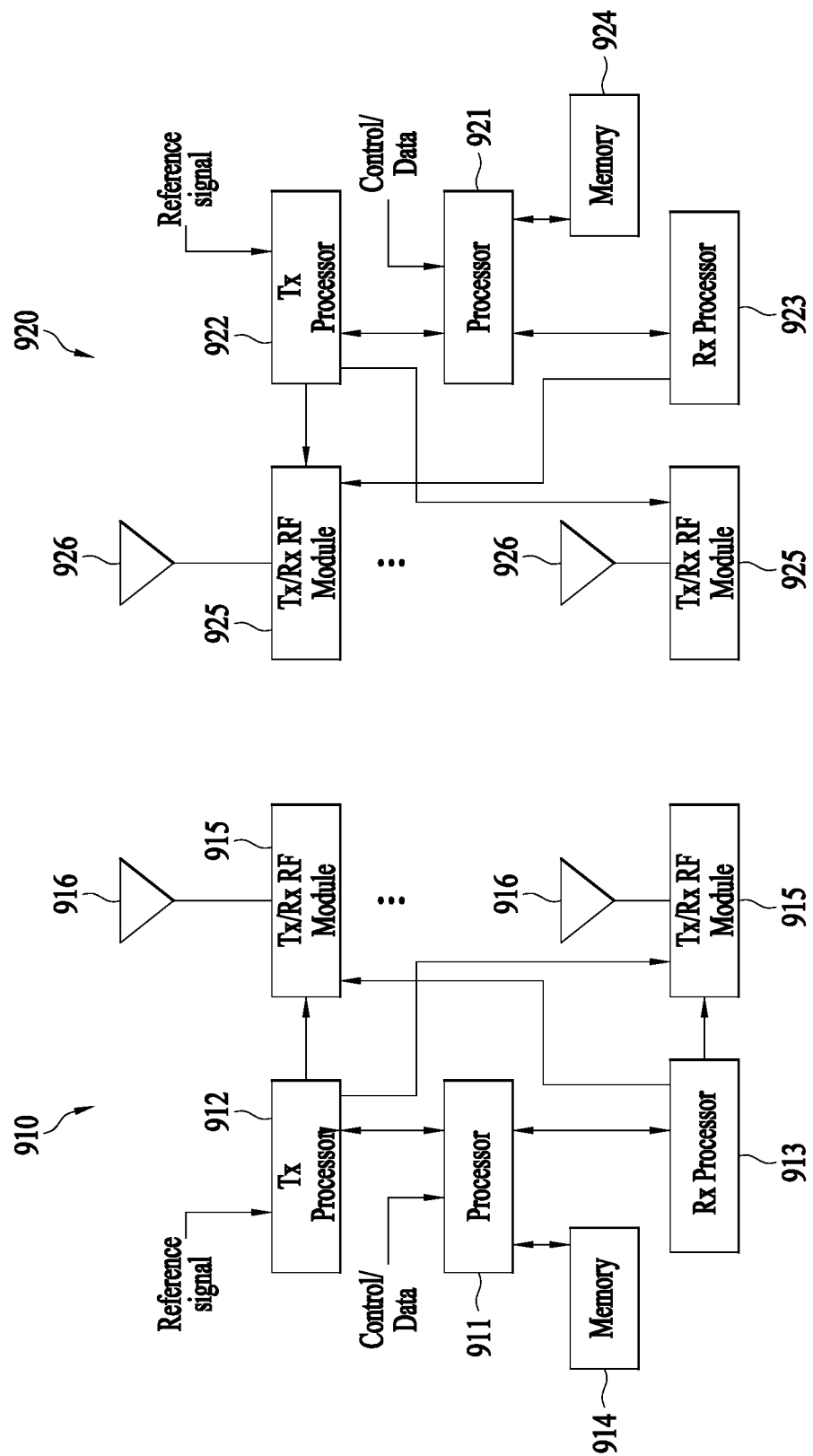
FIG. 4 shows an exemplary block diagram of a wireless communication system to which methods proposed in the present disclosure can be applied.

FIG. 4 is a block diagram illustrating a wireless communication system to which the methods proposed in the present disclosure are applicable.

Referring to FIG. 4, a device including an autonomous driving vehicle, hereinafter also referred to as "autonomous driving device", may be defined as a first communication device as indicated by a reference numeral 910. A processor 911 may perform a detailed operation for autonomous driving.

A 5G network including another vehicle that communicates with the autonomous driving device may be defined as a second communication device, as indicated by a reference numeral 920. A processor 921 may perform a detailed operation for autonomous driving.

The 5G network may also be referred to as the first communication device and the autonomous driving device may also be referred to as the second communication device.

The first communication device or the second communication device may be, for example, a base station, a network node, a transmitting terminal, a receiving terminal, a wireless device, a wireless communication device, and an autonomous driving device.

A terminal or user equipment (UE) may include, for example, a vehicle, a mobile phone, a smartphone, a laptop computer, a digital broadcast terminals, a personal digital assistant (PDA), a portable multimedia player (PMP), a navigator, a slate PC, a tablet PC, an ultrabook, and a wearable device such as a smartwatch, a smart glass, and a head mounted display (HMD), and the like. For example, the HMD may be a display device to be worn on a head. For example, the HMD may be used to implement a virtual reality (VR), an augmented reality (AR), or a mixed reality (MR). Referring to FIG. 4, the first communication device 910 and the second communication device 920 may include the processors 911 and 921, the memory 914 and 924, one or more Tx/Rx radio frequency (RF) modules 915 and 925, Tx processors 912 and 922, Rx processors 913 and 923, and antennas 916 and 926. The Tx/Rx module may also be referred to as a transceiver. Each of the Tx/Rx RF modules 915 and 925 may transmit a signal using the antennas 916 and 926. The processor may implement the functions, processes, and/or methods described herein. The processor 921 may be associated with the memory 924 that stores a program code and data. The memory may also be referred to as a computer-readable medium. Specifically, in downlink (DL) communication, for example, communication from the first communication device to the second communication device, the Tx processor 912 may implement various signal processing functions for a layer L1, that is, a physical layer. The Rx processor may implement various signal processing functions of the layer L1, that is, a physical layer.

Uplink (UL) communication, for example, communication from the second communication device to the first communication device may be processed in the first communication device 910 in a manner similar to that described with respect to the function of the receiver in the second communication device 920. Each of the Tx/Rx modules 925 may receive a signal using the antenna 926. Each of the Tx/Rx modules may provide a radio frequency (RF) carrier wave and information to the Rx processor 923. The processor 921 may be associated with the memory 924 that stores a program code and data. The memory may also be referred to as a computer-readable medium.

Figure 5:
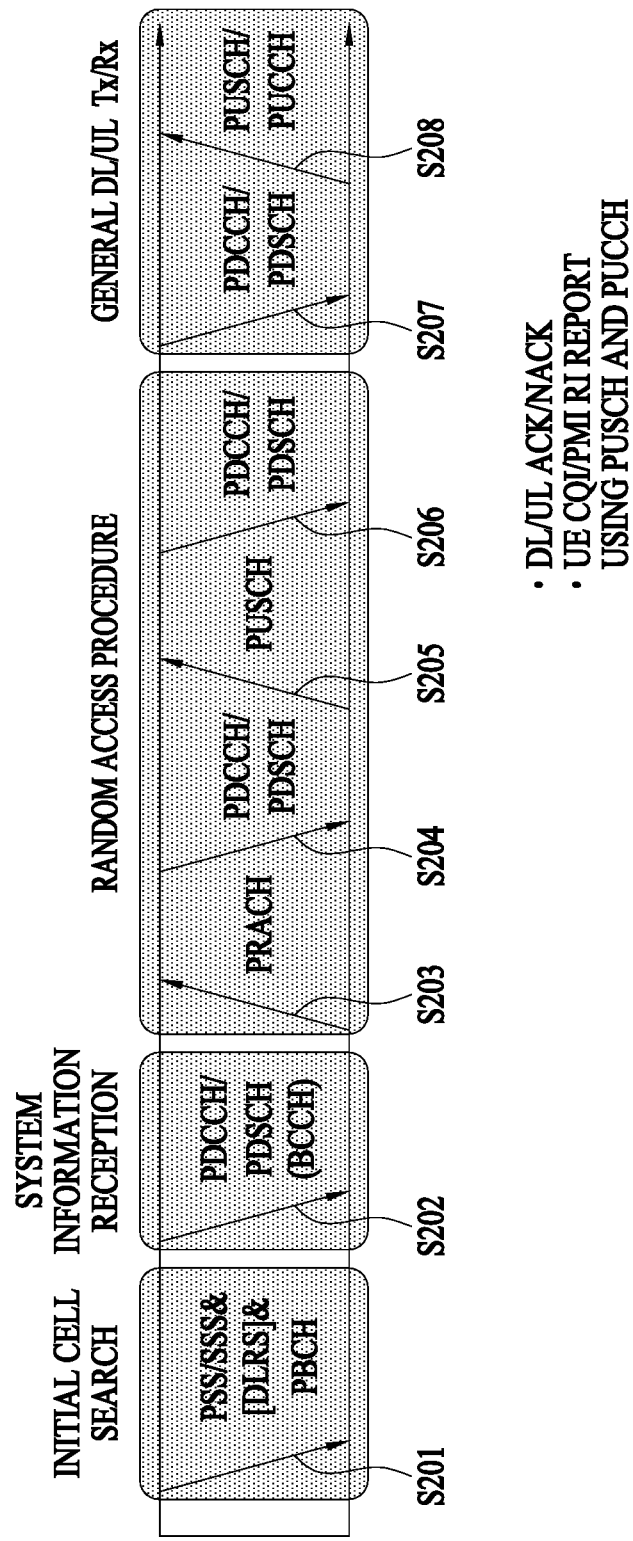
FIG. 5 is a diagram showing an example of a method for transmitting and receiving signals in a wireless communication system.

FIG. 5 illustrates an example of a signal transmission and reception method performed in a wireless communication system.

Referring to FIG. 5, in operation S201, when UE is powered on or enters a new cell, the UE performs an initial cell search procedure such as acquisition of synchronization with a BS. To this end, the UE may adjust synchronization with the BS by receiving a primary synchronization channel (P-SCH) and a secondary synchronization channel (S-SCH) from the BS and acquire information such as a cell identifier (ID). In an LTE system and a new radio (NR) system, the P-SCH and the S-SCH may also be referred to as a primary synchronization signal (PSS) and a secondary synchronization signal (SSS), respectively. After the initial cell search, the UE may acquire in-cell broadcast information by receiving a physical broadcast channel from the BS. In the initial cell search procedure, the UE may monitor a DL channel state by receiving a downlink reference signal (DL RS). When the initial cell search procedure is terminated, in operation S202, the UE may acquire more detailed system information by receiving a physical downlink control channel (PDCCH) and a physical downlink shared channel (PDSCH) based on information carried on the PDCCH.

Meanwhile, if the UE initially accesses the BS or if radio resources for signal transmission are absent, the UE may perform a random access procedure with respect to the BS in operations S203 through S206. To this end, the UE may transmit a specific sequence as a preamble through a physical random access channel (PRACH) in operations S203 and S205 and receive a random access response (RAR) message for the preamble through the PDCCH and the PDSCH corresponding to the PDCCH in operations S204 and S206. In the case of a contention-based RACH, the UE may additionally perform a contention resolution procedure.

After performing the above procedures, the UE may perform PDCCH/PDSCH reception in operation S207 and perform physical uplink shared channel (PUSCH)/physical uplink control channel (PUCCH) transmission in operation S208, as a general UL/DL signal transmission procedure. For example, the UE may receive downlink control information (DCI) through the PDCCH. The UE may monitor a set of PDCCH candidates in monitoring occasions set in one or more control element sets (CORESETs) on a serving cell based on corresponding search space configurations. The set of PDCCH candidates to be monitored by the UE may be defined in terms of search space sets. The search space set may be a common search space set or a UE-specific search space set. The CORESET may include a set of (physical) resource blocks having a time duration of one to three orthogonal frequency division multiplexing (OFDM) symbols. A network may set the UE to have a plurality of CORESETs. The UE may monitor PDCCH candidates in one or more search space sets. Here, the monitoring may indicate attempting to decode the PDCCH candidate(s) in the search space. When the UE succeeds in decoding one of the PDCCH candidates in the search space, the UE may determine that the PDCCH is detected in the corresponding PDCCH candidate and perform PDSCH reception or PUSCH transmission based on the DCI in the detected PDCCH. The PDCCH may be used to schedule DL transmission on the PDSCH and UL transmission on the PUSCH. Here, the DCI on the PDCCH may include downlink assignment, that is, a downlink grant (DL grant) including at least a modulation and coding format and resource allocation information in association with a downlink shared channel, or an uplink grant (UL grant) including a modulation and coding formal and resource allocation information in association with an uplink shared channel.

An initial access (IA) procedure performed in a 5G communication system will be further described with reference to FIG. 5.

UE may perform cell search, system information acquisition, beam alignment for initial access, DL measurement, and the like based on a synchronization signal block (SSB). The term "SSB" may be interchangeably used with the term "synchronization signal/physical broadcast channel (SS/PBCH) block".

The SSB may include a PSS, an SSS, and a PBCH. The SSB may include four consecutive OFDM symbols. For each of the OFDM symbols, the PSS, the PBCH, the SSS/PBCH, or the PBCH may be transmitted. The PSS and the SSS may each include one OFDM symbols and 127 subcarriers. The PBCH may include three OFDM symbols and 576 subcarriers.

The cell search may indicate a process in which the UE acquires time/frequency synchronization of a cell and detect a cell ID, for example, a physical layer cell ID (PCI) of the cell. The PSS may be used to detect a cell ID in a cell ID group. The SSS may be used to detect the cell ID group. The PBCH may be used for SSB (time) index detection and half-frame detection.

336 cell ID groups may be present. Three cell IDs may belong to each of the cell ID groups. Information on a cell ID group to which a cell ID of a cell belongs may be provided/acquired through an SSS of the cell. Information on the cell ID among 336 cells in the cell ID may be provided/acquired through the PSS.

The SSB may be periodically transmitted based on an SSB periodicity. When performing the initial cell search, a basic SSB periodicity assumed by the UE may be defined as 20 milliseconds (ms). After the cell connection, the SSB periodicity may be set to one of 5 ms, 10 ms, 20 ms, 40 ms, 80 ms, and 160 ms by a network, for example, the BS.

Acquisition of system information (SI) will be described as follows.

The SI may be divided into a master information block (MIB) and a plurality of system information blocks (SIBs). The SI other than the MIB may be referred to as remaining minimum system information (RMSI). The MIB may include information/parameter for monitoring the PDCCH that schedules the PDSCH carrying SystemInformationBlock1 (SIB1), and may be transmitted by the BS through the PBCH of the SSB. The SIB1 may include information associated with availabilities and scheduling (e.g., a transmission period and an SI-window size) of remaining SIBs (hereinafter, referred to as "SIBx", x being an integer greater than or equal to 2). The SIBx may be included in an SI message and transmitted through the PDSCH. Each SI message may be transmitted within a time window, that is, an SI-window occurring periodically.

A random access (RA) procedure performed in the 5G communication system will be further described with reference to FIG. 5.

The RA procedure may be used for various purposes. For example, the RA procedure may be used for network initial access, handover, and UE-triggered UL data transmission. The UE may acquire UL synchronization and UL transmission resources through the RA procedure. The RA procedure may include a contention-based RA procedure and a contention-free RA procedure. A detailed process of the contention-based RA procedure is described as follows.

The UE may transmit an RA preamble through the PRACH as Msg1 of the RA procedure in the UL communication. RA preamble sequences having two different lengths may be supported. A large sequence length of 839 may be applied to subcarrier spacing of 1.25 and 5 kilohertz (kHz). A small sequence length of 139 may be applied to subcarrier spacing of 15, 30, 60, and 120 kHz.

When the BS receives the RA preamble from the UE, the BS may transmit a random access response (RAR) message Msg2 to the UE. The PDCCH that schedules the PDSCH carrying the RAR may cyclic redundancy check (CRC)-masked with an RA radio network temporary identifier (RA-RNTI), and then transmitted. The UE may detect the PDCCH masked with the RA-RNTI and receive the RAR from the PDSCH scheduled by the DCI carried by the PDCCH. The UE may verify whether a preamble transmitted by the UE, that is, RAR information for the Msg1 is present in the RAR. Whether RA information for the Msg1 transmitted by the UE is present may be determined based on whether an RA preamble ID for the preamble transmitted by the UE is present. When a response to the Msg1 is absent, the UE may retransmit an RACH preamble within a predetermined number of times while performing power ramping. The UE may calculate PRACH transmitting power for retransmitting a preamble based on a most recent path loss and a power ramping counter.

The UE may perform the UL transmission on the uplink shared channel based on the RAR information as transmission of Msg3 in the random access procedure. The Msg3 may include an RRC connection request and a UE identifier. As a response to the Msg3, the network may transmit Msg4, which may treated as a contention resolution message on the DL. By receiving the Msg4, the UE may enter an RRC-connected state.

Ultra-reliable and low latency communication (URLLC) transmission defined in the NR may be transmission associated with: (1) a relatively low traffic amount; (2) a relatively low arrival rate; (3) an ultra-low latency requirement (e.g., 0.5 and 1 ms); (4) a relatively short transmission duration (e.g., 2 OFDM symbols); and (5) an urgent service/message. In the case of the UL, to satisfy a more stringent latency requirement, transmission of a specific type of traffic, for example, URLLC may be multiplexed with another transmission scheduled in advance, for example, enhanced Mobile Broadband communication (eMBB). As one method related thereto, information indicating that preemption is to be performed on predetermined resources is transmitted to the UE scheduled in advance, so that URLLC UE uses the corresponding resources for UL transmission.

In a case of the NR, dynamic resource sharing between the eMBB and the URLLC may be supported. eMBB and URLLC services may be scheduled on non-overlapping time/frequency resources. The URLLC transmission may occur on resources scheduled with respect to ongoing eMBB traffic. eMBB UE may not know whether PDSCH transmission of the corresponding UE is partially punctured. Also, due to corrupted coded bits, the UE may not decode the PDSCH. Considering this, a preemption indication may be provided in the NR. The preemption indication may also be referred to as an interrupted transmission indication.

In association with the preemption indication, the UE may receive DownlinkPreemption IE through RRC signaling from the BS. When the UE receives the DownlinkPreemption IE, the UE may be configured with an INT-RNTI provided by a parameter int-RNTI in the DownlinkPreemption IE for monitoring of the PDCCH conveying a DCI format 2_1. The UE may be additionally configured to have a set of serving cells by INT-ConfigurationPerServing Cell including a set of serving cell indices provided by serving- CellID and a corresponding set of positions for fields in the DCI format 2_1 by positionInDCI, configured to have information payload size for the DCI format 2_1 by dci-PayloadSize, and configured to have an indication granularity of time-frequency resources by timeFrequencySect.

The UE may receive the DCI format 2_1 from the BS based on the DownlinkPreemption IE.

When the UE detects the DCI format 2_1 for a serving cell in a set of serving cells, the UE may assume that no transmission to the UE is performed in symbols and PRBs indicated by the DCI format 2_1 among a set of symbols and a set of PRBs corresponding to the last monitoring period of a monitoring period to which the DCI format 2_1 belongs. For example, the UE may determine that a signal in the time-frequency resources indicated by the preemption is not the DL transmission scheduled for the UE and thus, decode data based on signals received in remaining resource areas.

Figure 6:
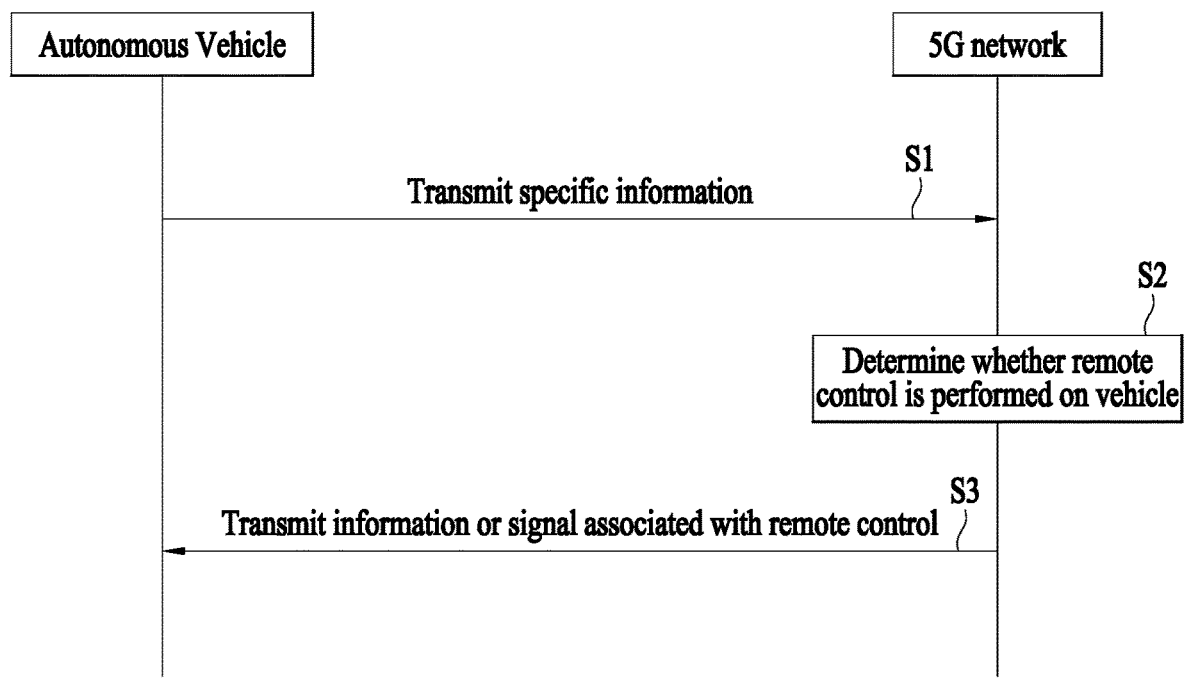
FIG. 6 shows an example of basic operations of an autonomous vehicle and a 5G network in a 5G communication system.

FIG. 6 illustrates an example of basic operations of an autonomous vehicle and a 5G network in a 5G communication system.

In operation S1, the autonomous vehicle may transmit specific information to a 5G network. The specific information may include autonomous driving-related information. In operation S2, the 5G network may determine whether a remote control is performed on the vehicle. Here, the 5G network may include a server or a module for performing an autonomous driving-related remote control. In operation S3, the 5G network may transmit information or a signal associated with the remote control to the autonomous vehicle.

Hereinafter, an operation of the autonomous vehicle using 5G communication will be described in detail with reference to FIGS. 4 and 5 and the aforementioned wireless communication technologies such as a beam management (BM) procedure, URLLC, massive Machine Type Communication (mMTC), and the like.

A basic procedure of an application operation to which the method proposed in the present disclosure and eMBB technology of the 5G communication are applicable will be described.

Likewise operations S1 and S3 of FIG. 6, to transmit and receive a signal, information, and the like to and from the 5G network, the autonomous vehicle may perform an initial access procedure and a random access procedure in connection with the 5G network before operation S1 of FIG. 6 is performed.

Specifically, the autonomous vehicle may perform the initial access procedure in connection with the 5G network based on an SSB to acquire a DL synchronization and system information. In the initial access procedure, a BM process and a beam failure recovery process may be added. Also, a quasi-co location (QCL) relationship may be added in a process of receiving a signal from the 5G network by the autonomous vehicle.

The autonomous vehicle may perform the random access procedure in connection with the 5G network for acquisition of a UL synchronization and/or UL transmission. The 5G network may transmit a UL grant for scheduling transmission of specific information to the autonomous vehicle. The autonomous vehicle may transmit the specific information to the 5G network based on the UL grant. In addition, the 5G network may transmit a DL grant for scheduling transmission of a result of 5G processing for the specific information to the autonomous vehicle. The 5G network may transmit information or a signal associated with the remote control to the autonomous vehicle based on the DL grant.

A basic procedure of an application operation to which URLLC technology of the 5G communication and the method proposed in the present disclosure are applicable will be described as follows.

As described above, the autonomous vehicle may perform the initial access procedure and/or the random access procedure in connection with the 5G network, and then receive DownlinkPreemption IE from the 5G network. The autonomous vehicle may receive DownlinkPreemption IE a DCI format 2_1 including a preemption indication from the 5G network. The autonomous vehicle may not perform, expect, or assume reception of eMBB data on resources, for example, a PRB and/or an OFDM symbol indicated by the preemption indication. Thereafter, when specific information is to be transmitted, the autonomous vehicle may receive the UL grant from the 5G network.

A basic procedure of an application operation to which mMTC technology of the 5G communication and the method proposed in the present disclosure are applicable will be described as follows.

Among operations of FIG. 6, a part changed according to the application of the mMTC technology will be mainly described.

Referring to FIG. 6, in operation S1, the autonomous vehicle may receive a UL grant from the 5G network to transmit specific information to the 5G network. Here, the UL grant may include information on a number of repetitions for transmission of the specific information. The specific information may be repetitively transmitted based on the information on the number of repetitions. That is, the autonomous vehicle may transmit the specific information to the 5G network based on the UL grant. The repetitive transmission of the specific information may be performed through frequency hopping. For example, first transmission of the specific information may be performed on a first frequency resource and second transmission of the specific information may be performed on a second frequency resource. The specific information may be transmitted through a narrowband of a resource block 1RB or a resource block 6RB.

Figure 7:
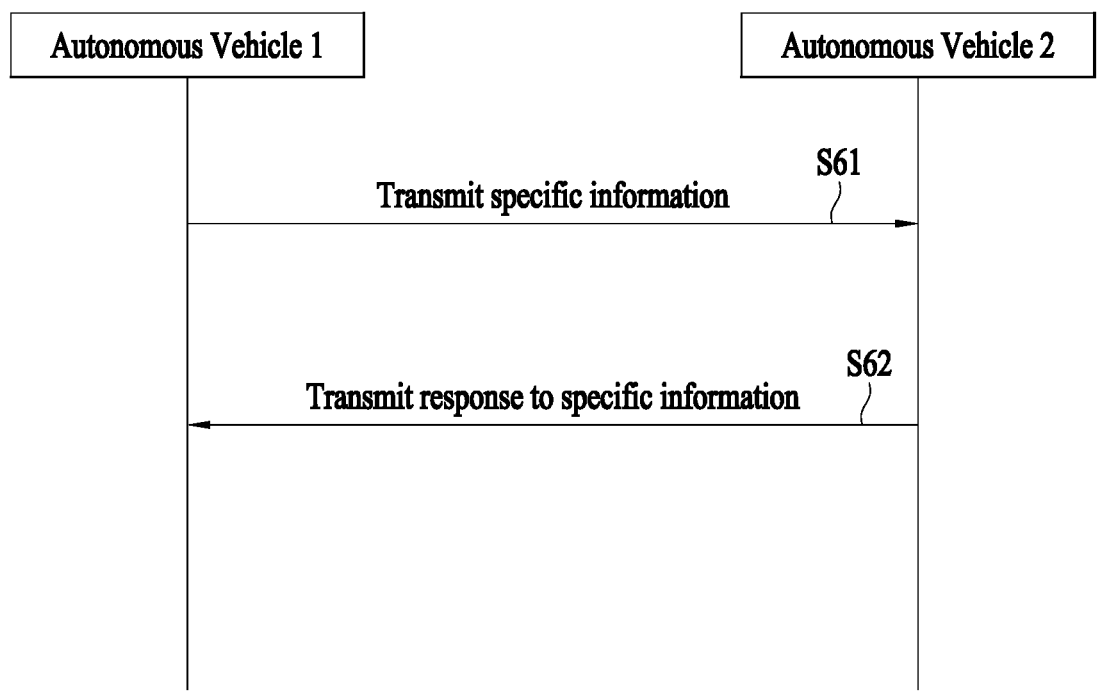
FIG. 7 shows an example of basic operations between one vehicle and another vehicle through 5G communication.

FIG. 7 illustrates an example of basic operations performed between a vehicle and another vehicle using 5G communication.

In operation S61, a first vehicle may transmit specific information to a second vehicle. In operation S62, the second vehicle may transmit a response to the specific information to the first vehicle.

A configuration of application operations between a vehicle and another vehicle may vary based on whether the 5G network is involved directly (sidelink communication transmitting mode 3) or indirectly (sidelink communication transmitting mode 4) with the specific information and resource allocation of a response to the specific information.

Application operations performed between a vehicle and another vehicle using the 5G communication will be described as follows.

First, how the 5G network is directly involved in resource allocation of signal transmission/reception between vehicles will be described.

The 5G network may transmit a DCI format 5A for scheduling of mode-3 transmission (PSCCH and/or PSSCH transmission) to the first vehicle. Here, a physical sidelink control channel (PSCCH) may be a 5G physical channel for scheduling transmission of specific information. Also, a physical sidelink shared channel (PSSCH) may be a 5G physical channel for transmitting the specific information. The first vehicle may transmit an SCI format 1 for scheduling transmission of specific information to the second vehicle on the PSCCH. Also, the first vehicle may transmit the specific information to the second vehicle on the PSSCH.

Next, how the 5G network is indirectly involved in resource allocation of signal transmission/reception between vehicles will be described.

The first vehicle may sense a resource for the mode-4 transmission in a first window. The first vehicle may select a resource for the mode-4 transmission in a second window based on a result of the sensing. Here, the first window may be a sensing window and the second window may be a selection window. The first vehicle may transmit the SCI format 1 for scheduling transmission of specific information to the second vehicle on the PSCCH based on the selected resource. Also, the first vehicle may transmit the specific information to the second vehicle on the PSSCH.

The autonomous vehicle performing at least one of V2V communication and V2X communication may transmit and receive information on a channel of the corresponding communication. For example, for the V2V communication and the V2X communication, channels for sidelinks corresponding to the communication methods may be allocated, so that the autonomous vehicle transmits and receives information on the corresponding channel to and from a server or another vehicle. Also, a shared channel for a sidelink may be allocated, so that a signal for at least one of the V2V communication and the V2X communication is transmitted and received on the corresponding channel. In order to perform at least one of the V2V communication and the V2X communication, the autonomous vehicle may acquire a separate identifier of the corresponding communication from at least one of a base station, a network, and another vehicle. The autonomous vehicle may perform the V2V communication and the V2X communication based on information on the acquired separate identifier.

Information transmitted through broadcasting may be transmitted on a separate channel for broadcasting. Node-to-node communication may be performed on a channel different from the channel for broadcasting. Also, information for controlling the autonomous vehicle may be transmitted on a channel for URLLC.

Figure 8:
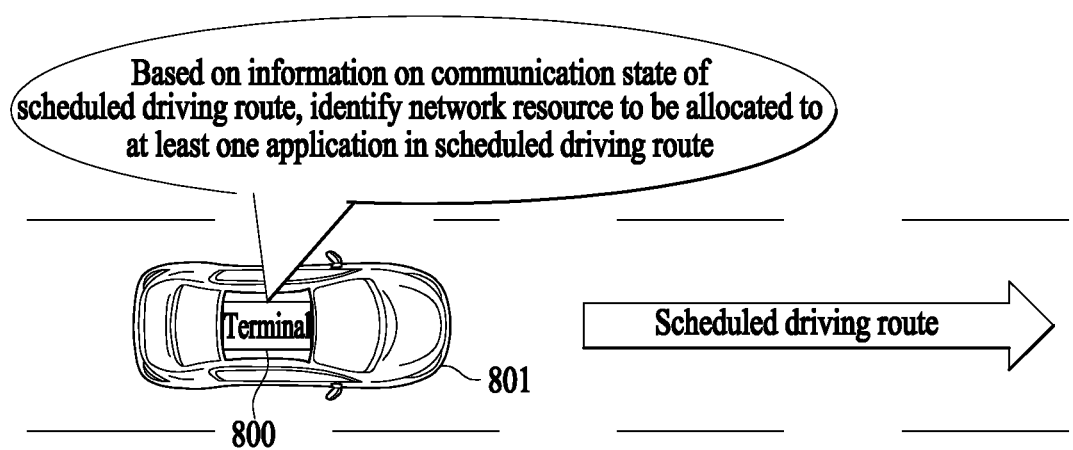
FIG. 8 shows an example in which a terminal of a vehicle operates.

FIG. 8 shows an example in which a terminal of a vehicle operates.

A terminal 800 may be included in a vehicle 801. For example, the vehicle 801 may be an autonomous vehicle.

The terminal 800 may identify a network resource to be allocated to at least one application on a scheduled driving route based on information on a communication state of the scheduled driving route of the vehicle 801. Specifically, since the at least one application installed in the vehicle 801 operates based on communication of the vehicle 801, the terminal 800 may determine whether a communication state of the scheduled driving route of the vehicle 801 meets a Quality of Service (QoS) requirement for each of the at least one application. Then, based on a result of the determination, the terminal 800 may identify a network resource to be allocated to the at least one application on the scheduled driving route. For example, the terminal 800 may determine whether a total bandwidth necessary for the at least one application exceeds a bandwidth available in a first area of the scheduled driving route, and, when it is determined that the total bandwidth necessary for the at least one application exceeds the bandwidth available in a first area of the scheduled driving route, the terminal 800 may make an adjustment such that a bandwidth to be allocated to a first application among the at least one application is reduced by changing a service level of the first application in the first area. Therefore, while the vehicle 801 drives along the scheduled driving route, the terminal 800 may allocate an identified network resource to at least one application so that a service is provided to a user through the at least one application.

Accordingly, in a vehicle driving environment where a communication state can change from time to time, the terminal 800 may acquire information on a communication state of a scheduled driving route in advance and identify or determine a network resource in advance to be allocated to at least one application on the scheduled driving route, so that latency or interruption of a service provided through the at least one application is prevented. In addition, the terminal 800 is capable of identifying or determine in advance the network resource to be allocated to at least one application on the scheduled driving route, and thus, when latency or interruption of the service provided through the at least one application is expected, the terminal 800 may inform a user of the delay or interruption.

Figure 9:
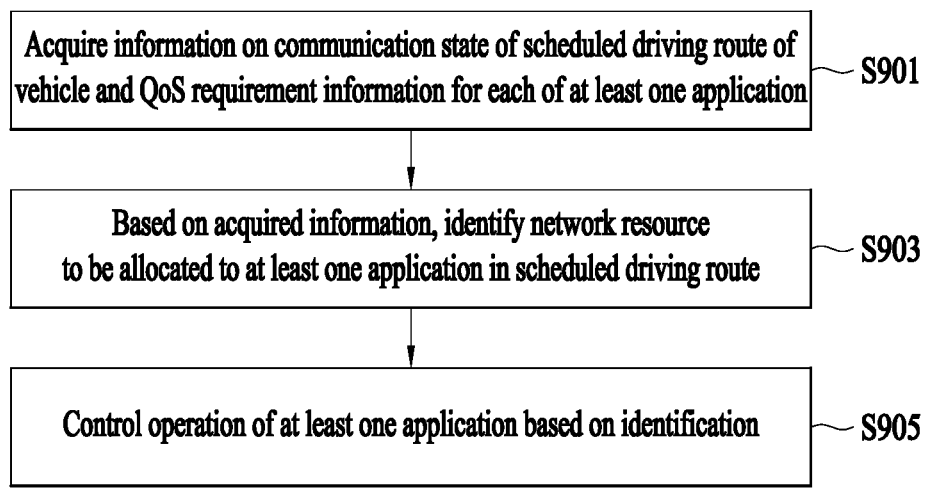
FIG. 9 shows a flowchart of how a terminal of a vehicle according to an embodiment operates.

FIG. 9 shows a flowchart of how a terminal of a vehicle according to an embodiment operates.

In step S901, the terminal 800 may acquire information on a communication state of the scheduled driving route and Quality of Service (QoS) requirement information for each of the at least one application. The at least one application installed in the vehicle may operate based on a communication network of the vehicle. Specifically, the at least one application may provide a service by receiving data from an external server or Cloud. For example, the at least one application may include an application for providing a conference call service, an application for providing a video streaming service, an application for providing an email transmission and reception service, and the like.

The terminal 800 may transmit information regarding the scheduled driving route to the external server or Cloud, and receive information on a communication state of each of a plurality of areas in the scheduled driving route. The information on the communication state may include information on an available bandwidth, information on latency, information on a capacity or a current usage, and the like. In addition, the information on the communication state may include QoS information regarding a communication network of a corresponding area. For example, the terminal 800 may acquire the information on the communication state of each of the plurality of areas in the scheduled driving route through a smart antenna.

The terminal 800 may acquire QoS requirement information for each of the at least one application from the at least one application installed in the vehicle. The QoS requirement information may include information on a bandwidth required upon operation of a corresponding application, information on latency required upon operation of the corresponding application, priority information, information regarding whether a real-time processing is required, and information on a range within which a service level can be changed.

In step S903, the terminal 800 may identify a network resource to be allocated to the at least one application on the scheduled driving route based on the information acquired in the step S901. Specifically, the terminal 800 may determine a network resource which is to be allocated to each of the at least one application from among entire network resources available to be allocated in each area of the scheduled driving route. A network resource may include a bandwidth, a buffer, and the like. For example, the terminal 800 may determine a bandwidth and a buffer size to be allocated to each of the at least one application in each area of a scheduled driving route, and may determine a buffering time for each of the at least one application as well.

Based on information on a communication state of a first area of the scheduled driving route and QoS requirement information for each of the at least one application, the terminal 800 may determine whether the communication state of the first area meets a QoS requirement for at least one application. Based on a result of the determination as to whether the QoS requirement is met, the terminal 800 may determine a network resource to be allocated to the at least one application in the first area. For example, when the communication state of the first area included in the scheduled driving route meets the QoS requirement for the at least one application, the terminal 800 may allocate a bandwidth necessary for a first application to the first application from a total bandwidth available in the first area to the first application and allocate a bandwidth necessary for a second application to the second application from the total bandwidth available in the first area.

For example, the terminal 800 may determine whether a total bandwidth necessary for at least one application exceeds a total bandwidth available in the first area of the scheduled driving route. When it is determined that the total bandwidth necessary for the at least one application exceeds the total available bandwidth, the terminal 800 may make an adjustment such that a bandwidth to be allocated to a first application among the at least one application is reduced by changing a service level of the first application. A further detailed example will be described with reference to FIG. 11.

As another example, the terminal 800 may determine whether latency expected upon operation of the first application in the first area of the scheduled driving route exceeds allowable latency of the first application. When it is determined that the latency expected upon operation of the first application in the first area of the scheduled driving route exceeds the allowable latency of the first application, the terminal 800 may make an adjustment such that a buffer size to be allocated to the first application in a second area preceding the first area within the driving schedule route is increased. A further detailed embodiment will be described with reference to FIG. 12.

In step S905, the terminal 800 may control an operation of at least one application based on the identification performed in the step S903. Specifically, while the vehicle drives along the scheduled driving route, the terminal 800 may control an operation of the at least one application by allocating the network resource identified in the step S903 to the at least one application. In addition, the terminal 800 may provide at least one service by the at least one application to a passenger.

Figure 10:
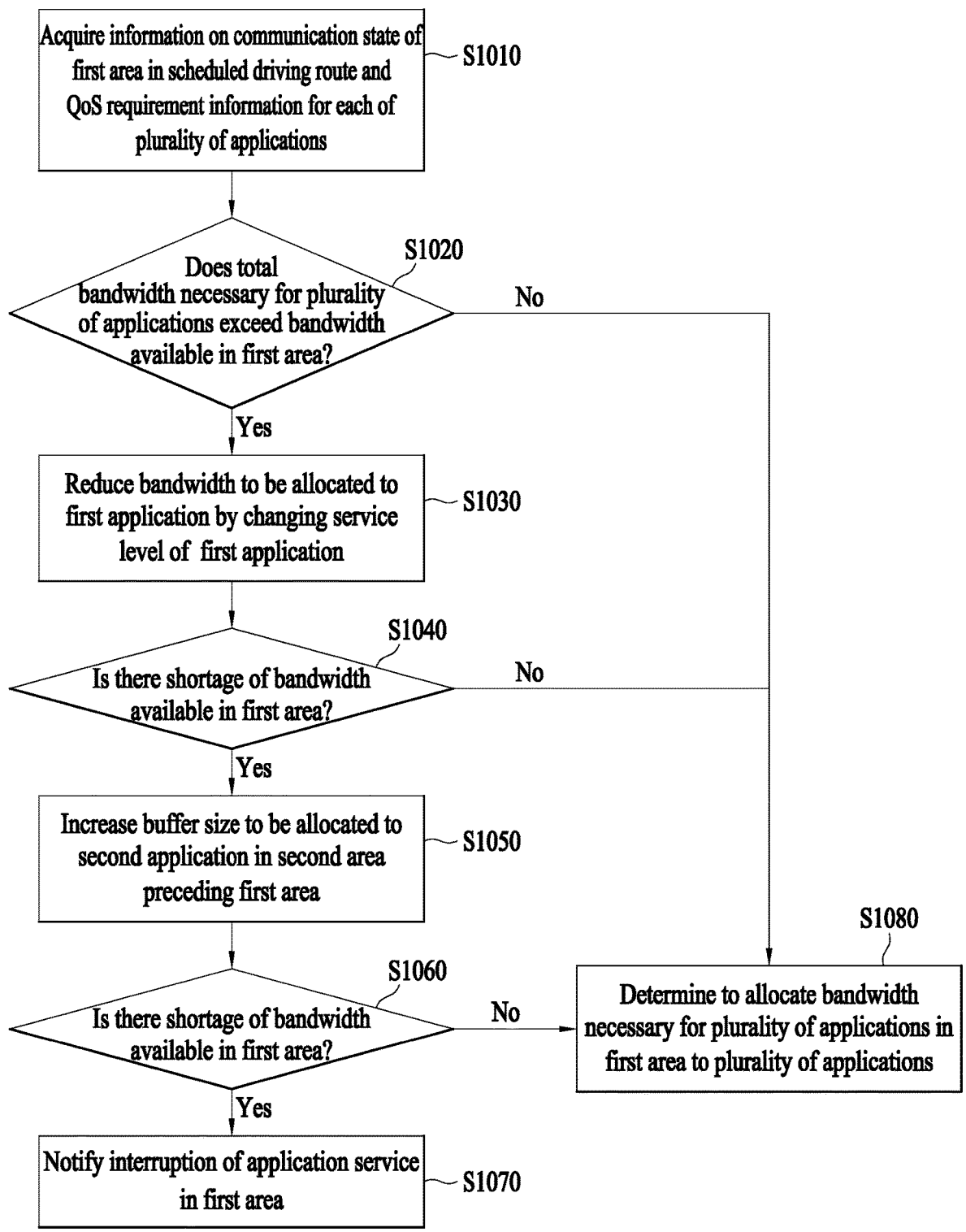
FIG. 10 shows a detailed flowchart of how a terminal identifies a network resource to be allocated to a plurality of applications in a first area of a scheduled driving route.

FIG. 10 shows a detailed flowchart of how a terminal identifies a network resource to be allocated to a plurality of applications in a first area of a scheduled driving route.

In step S1010, a terminal 800 may acquire information on a communication state of a first area of a scheduled driving route and QoS requirement information for each of a plurality of applications which is to be executed in the first area. For example, in response to a service request regarding a specific application, the terminal 800 may acquire QoS requirement information for each of the plurality of applications including the specific application and the information on the communication state of the first area.

In step S1020, the terminal 800 may determine, based on the information acquired in the step S1010, whether a total bandwidth necessary for the plurality of applications exceed a bandwidth available in the first area. For example, the terminal 800 may determine whether a total bandwidth necessary for the plurality of applications on the unit basis of a time slot (e.g., 1 second) exceeds a bandwidth available in the first area.

When it is determined in the step S1020 that the total bandwidth necessary for the plurality of applications do not exceed the bandwidth available in the first area, the terminal 800 may determine to allocate the bandwidth necessary for the plurality of applications in the first area to the plurality of applications in step S1080.

When it is determined in the step S1020 that the total bandwidth necessary for the plurality of applications exceeds the bandwidth available in the first area, the terminal 800 may make an adjustment such that a bandwidth to be allocated to the first application is reduced by changing a service level of the first application in the first area in step S1030. Specifically, since a bandwidth necessary for the first application may vary depending on the service level of the first application, the terminal 800 may make an adjustment such that a bandwidth to be allocated to the first application is reduced by changing the service level of the first application. For example, the first application may be an application for providing a conference call service and resolution of an image may be changed in phase, and therefore, a bandwidth necessary for the first application may vary depending on the resolution of the image.

By taking into account priorities of the plurality of applications, the terminal 800 may select a specific application of which a service level needs to be changed. Specifically, the terminal 800 may make an adjustment such that a bandwidth to be allocated to an application with a low priority among the plurality of application is reduced by changing a service level of the application with the low priority. For example, in case where a request for a conference call service through a third application is received from a different passenger while the terminal 800 provides a video streaming service to a passenger through a first application, since the first application has a priority lower than a priority of the third application, the terminal 800 may make an adjustment such that a bandwidth to be allocated to the first application is reduced by changing a service level of the first application in the first area.

Based on a result of the adjustment made in step S1030, the terminal 800 may determine whether a bandwidth available in the first area is in shortage in step S1040. In other words, after making an adjustment such that the bandwidth to be allocated to the first application is reduced in the step S1030, the terminal 800 may determine whether a total bandwidth necessary for the plurality of applications exceeds the bandwidth available in the first area. When it is determined in the step S1040 that the bandwidth available in the first area is not in shortage, the terminal 800 may determine to allocate the bandwidth necessary for the plurality of applications in the first area to the plurality of applications in the step S1080.

When it is determined in the step S1040 that the bandwidth available in the first area is in shortage, the terminal 800 may make an adjustment such that a buffer size to be allocated to the second application in a second area preceding the first area is increased in step S1050. The second application may be an application of which a service is not required to be provided in real time. Specifically, when there is a sufficient bandwidth to be allocated to the second application in the second area preceding the first area within the scheduled driving route, the terminal 800 may increase a bandwidth to be allocated to the second application in the second area and thereby increase an amount of data to buffer prior to the first area. As a result, the terminal 800 may reduce the bandwidth to be allocated to the second application in the first area. For example, the second application may be an application for providing a multimedia service, and the terminal 800 may increase a buffer size to be allocated to a specific application in the second area preceding the first area and thereby download in advance data that is necessary to provide the multimedia service.

The terminal 800 may select the second application by taking into account priorities of the plurality of applications. Specifically, the terminal 800 may select an application of a low priority among the plurality of applications as the second application.

The sequence of the steps S1040 and S1060 are merely exemplary, and the step S1060 may be performed earlier than the step S1040.

Based on a result of the adjustment made in in the step S1050, the terminal 800 may determine whether the bandwidth available in the first area is in shortage in step S1060. In other words, after making the adjustment in the step S1050, the terminal 800 may determine whether a total bandwidth necessary for the plurality of applications exceeds the bandwidth available in the first area. When it is determined in the step S1060 that the bandwidth available in the first area is not in shortage, the terminal 800 may determine to allocate the bandwidth necessary for the plurality of applications in the first area to the plurality of applications in the step S1080.

When it is determined in the step S1060 that the bandwidth available in the first area is in shortage, the terminal 800 may provide a notification regarding interruption of an application service in the first area in step S1070. Specifically, by taking into account priorities of the plurality of applications, the terminal 800 may determine to allocate a bandwidth available in the first area to applications with higher priorities, and may provide a notification indicating that interruption or latency of a service provided through an application to which a bandwidth is not allocated in the first area. For example, the terminal 800 may notify, through a display, a user of the fact that a service of a specific application is interrupted in the first area.

Figure 11:
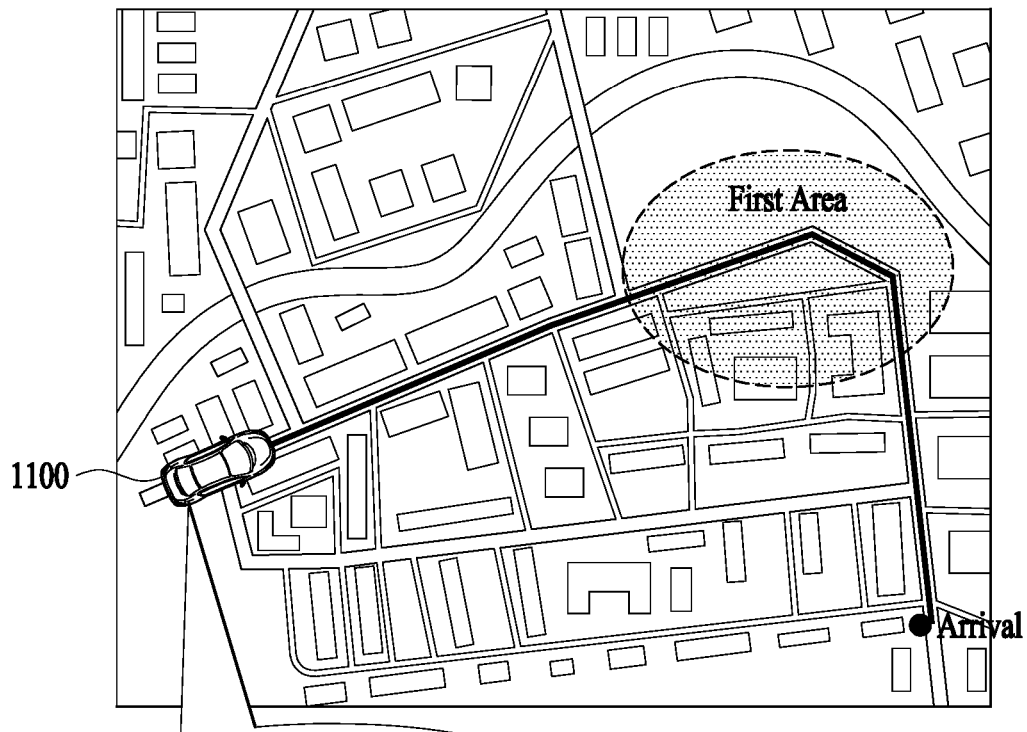
FIG. 11 shows an example in which a vehicle identifies a network resource to be allocated to an application based on information on a communication state of a first area.

FIG. 11 shows an example in which a vehicle identifies a network resource to be allocated to an application based on information on a communication state of a first area.

A vehicle 1100 may acquire information on a communication state of a first area of a scheduled driving route and QoS requirement information 1110 for a plurality of applications installed in the vehicle 1100. Specifically, the vehicle 1100 may identify information on a bandwidth available in the first area and information on latency in the first area through the information on the communication state of the first area, and may identify respective bandwidth information necessary for a first application and a second application, latency information, information indicating whether a service is provided in real time, and priority information through the QoS requirement information 1110. The QoS requirement information 1110 in FIG. 11 is described as having values of 1 to 5, but aspects of the present disclosure are not limited thereto and the QoS requirement information may be a numeric value expressed in bit per second (bps).

Based on the acquired information, the vehicle 1100 may determine whether the communication state of the first area meets a QoS requirement for the plurality of applications. Specifically, the vehicle 1100 may determine whether a total bandwidth necessary for the first application and the second application exceed a bandwidth available in the first area of the scheduled driving route. For example, the vehicle 1100 may identify that a bandwidth available in the first area is "8", that a bandwidth necessary for the first application is "5", and that a bandwidth necessary for the second application is "5", and, as a result, the vehicle 1100 may determine that a total bandwidth necessary for the first application and the second application is "10" which exceeds the bandwidth of "8" available in the first area.

The vehicle 1100 may make an adjustment such that a bandwidth to be allocated to the second application in the first area is reduced, by changing a service level of the second application. For example, in case where the second application is an application for providing a conference call service, a bandwidth necessary for the second application differs depending on resolution of an image, and thus, the vehicle 1100 may change a service level of the second application in the first area from "high quality" to "low quality" and thereby make an adjustment such that a bandwidth necessary for the second application is reduced from "5" to "3".

Accordingly, while driving in the first area, the vehicle 1100 may control operations of the first application and the second application by allocating bandwidth "5" to the first application and bandwidth "3" to the second application from among the bandwidth "8" available in the first area. In addition, the vehicle 1100 may provide a passenger in the vehicle 1100 with information indicating that the service level of the second application is changed from "high quality" to "low quality". For example, in case of entering the first area, the vehicle 1100 may provide a passenger with a message which, for example, states "The current driving route includes an area where latency occurs for X seconds. In order to smoothly provide a conference call service, the conference is possible in the corresponding area only by voice".

Figure 12:
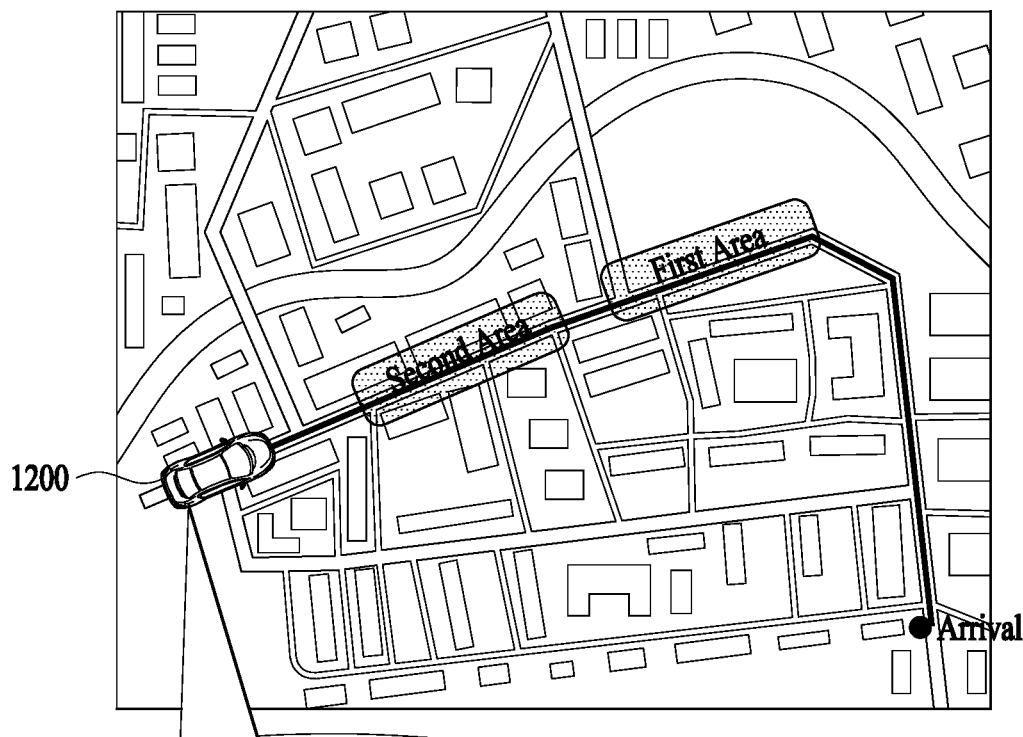
FIG. 12 shows another example in which a vehicle identifies a network resource to be allocated to an application based on information on a communication state of a first area.

FIG. 12 shows another example in which a vehicle identifies a network resource to be allocated to an application based on information on a communication state of a first area.

A vehicle 1200 may acquire information on a communication state of a first area of a scheduled driving route and QoS requirement information 1210 for a first application installed in the vehicle 1200. Specifically, the vehicle 1100 may identify information regarding latency expected in the first area through the information on the communication state of the first area, and may provide bandwidth information necessary for the first application, allowable latency information, information indicating whether a service is provided in real time, and priority information through the QoS requirement information 1210. For example, the first application may be an application for providing a multimedia service, such as playing movie, the application which is not required to provide a service in real time.

Based on the acquired information, the vehicle 1200 may determine whether the communication state of the first area meets a QoS requirement for the first application. Specifically, the vehicle 1200 may determine whether latency expected upon operation of a first application in the first area exceeds allowed latency for the first application. For example, the vehicle 1200 may determine that allowed latency for the first application is 10 seconds and that latency expected upon operation of the first application in the first area exceeds 10 seconds.

The vehicle 1200 may make an adjustment such that a buffer size to be allocated to the first application in a second area preceding the first area within the scheduled driving route is increased. In other words, the vehicle 1200 may make an adjustment such that a buffer size to be allocated to the first application in the second area is increased from a basic buffer size. Thus, before entering the first area, the vehicle 1200 may be allowed to receive in advance data of the first application as much as a buffer size that has been increased in the second area.

Accordingly, when driving in the second area, the vehicle 1200 may receive in advance even data necessary for the first application for providing a service in the first area, and thus, it is possible to smoothly control an operation of the first application even though latency is long in the first area. In addition, before entering the first area, the vehicle 1200 may provide a passenger in the vehicle 1200 with information indicating that data as much as the buffer size which has been increased in the second area is to be received in advance.

Figure 13:
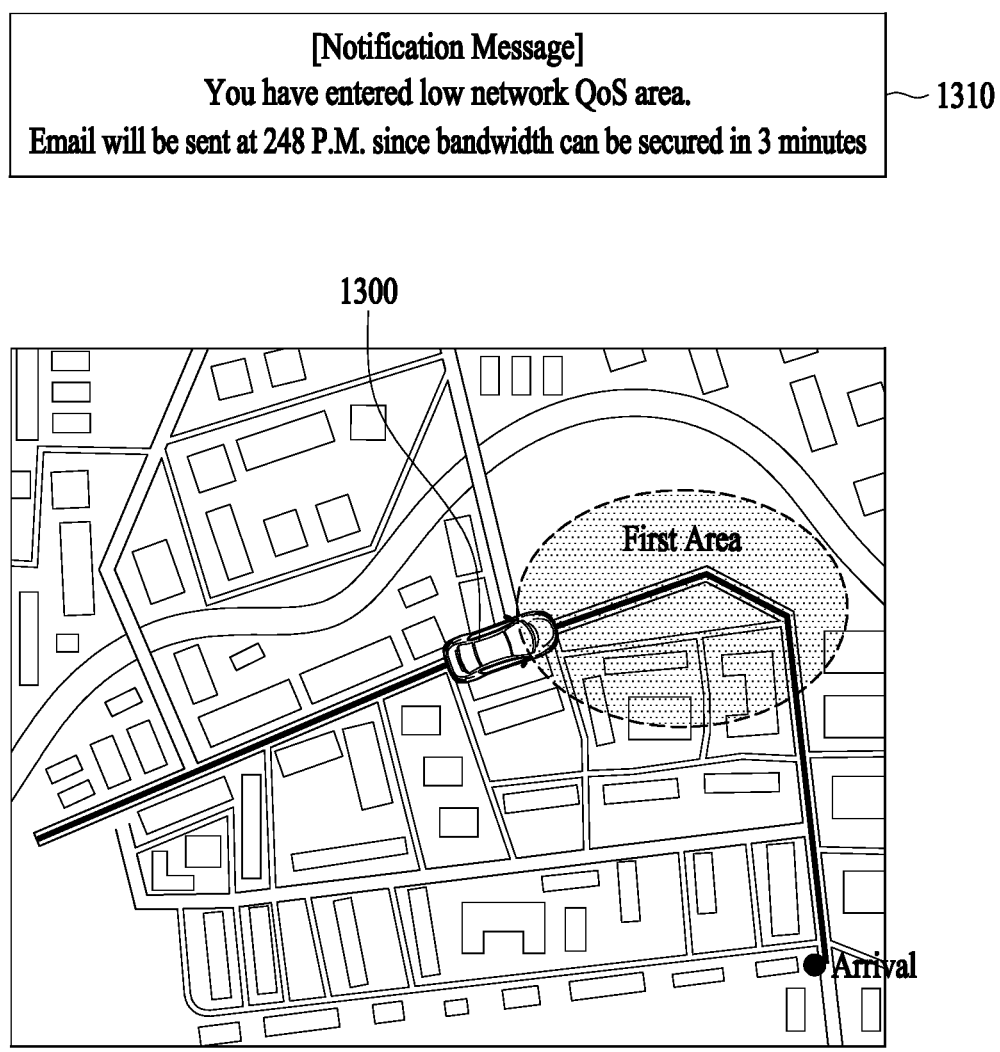
FIG. 13 shows an example in which a vehicle controls an operation of an application based on information on a communication state of a first area.

FIG. 13 shows an example in which a vehicle controls an operation of an application based on information on a communication state of a first area.

A vehicle 1300 may acquire information on a communication state of a first area of a scheduled driving route and QoS requirement information for at least one application installed in the vehicle 1300.

When driving in the first area, the vehicle 1300 may receive, from a passenger, an operation command for a specific application that provides an email transmission and reception service. Based on the information on the communication state of the first area and QoS requirement information for the specific application, the vehicle 1300 may determine that there is a shortage of bandwidth to be allocated to the specific application in the first area. Accordingly, the vehicle 1300 may provide a passenger with a message 1310 in response to the operation command from the passenger. For example, the vehicle 1300 may provide the message 1310 to the passenger through a display.

Likewise, in case where a passenger transmits a command for reading an email through the specific application to the vehicle 1300 while the vehicle 1300 drives in the first area, the vehicle 1300 may determine that there is a shortage of network bandwidth to be allocated to the specific application in the first area and thus may provide the passenger with a message saying "You have entered a low network QoS area. Email will be read at 2:47 P.M. since bandwidth can be secured in 2 minutes".

Figure 14:
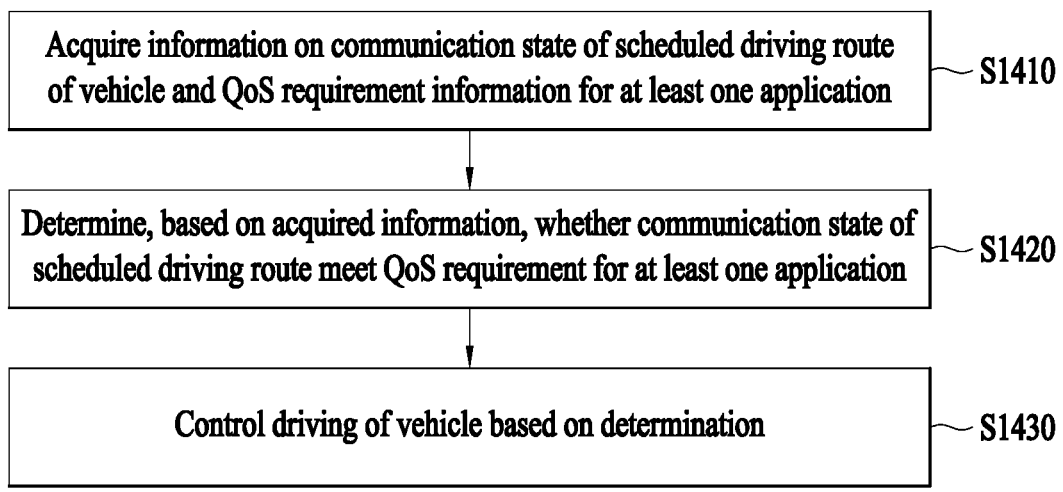
FIG. 14 shows a flowchart of how to a terminal of a vehicle according to another embodiment operates.

FIG. 14 shows a flowchart of how to a terminal of a vehicle according to another embodiment operates.

In step S1410, a terminal 800 may acquire information on a communication state of a scheduled driving route and Quality of Service (QoS) requirement information for each of the at least one application. The step S1410 corresponds to the step S901 of FIG. 9 and thus a redundant description is herein omitted.

Based on the information acquired in the step S1410, the terminal 800 may determine whether the communication state of the scheduled driving route meets a QoS requirement for the at least one application in step S1420. The step S1420 corresponds to the step S903 of FIG. 9 and thus a redundant description is herein omitted.

In the step S1430, the terminal 800 may control driving of the vehicle based on a result of the determination made in the step S1420.

For example, when the communication state of the first area of the scheduled driving route fails to meet the QoS requirement for the at least one application, the terminal 800 may control the vehicle such that the vehicle drives at a high speed in the first area. In other words, the terminal 800 may control the vehicle such that the vehicle can quickly move out of the first area of which a communication state is too poor to execute the at least one application. In addition, in case where the terminal 800 determines to increase a buffer size to be allocated to a specific application in a second area preceding the first area, the terminal 800 may control the vehicle such that the vehicle drives at a low speed in the second area and drives at a high speed in the first area. By taking into account real-time traffic information or speed limit information of the scheduled driving route, the terminal 800 may determine a speed for the low-speed driving or the high-speed driving of the vehicle.

As another example, when the communication state of the first area of the scheduled driving route fails to meet the QoS requirement for the at least one application, the terminal 800 may change the scheduled driving route such that the vehicle does not drive in the first area. In other words, the terminal 800 may reconfigure a scheduled driving route such that the reconfigured scheduled driving route does not include the first area. Accordingly, the terminal 800 may control the vehicle such that the vehicle drives along the scheduled driving route that has been changed.

As yet another example, the terminal 800 may acquire information on a communication state of each route to a destination, search for a route meeting the QoS requirement for the at least one application based on the acquired information, and control the vehicle such that the vehicle drives along the found route.

Accordingly, the terminal 800 may control driving of the vehicle based on information on a communication state of the scheduled driving route, and therefore, it is possible to prevent latency or interruption of a service provided through an application or to minimize time of the latency or interruption of the service.

Figure 15:
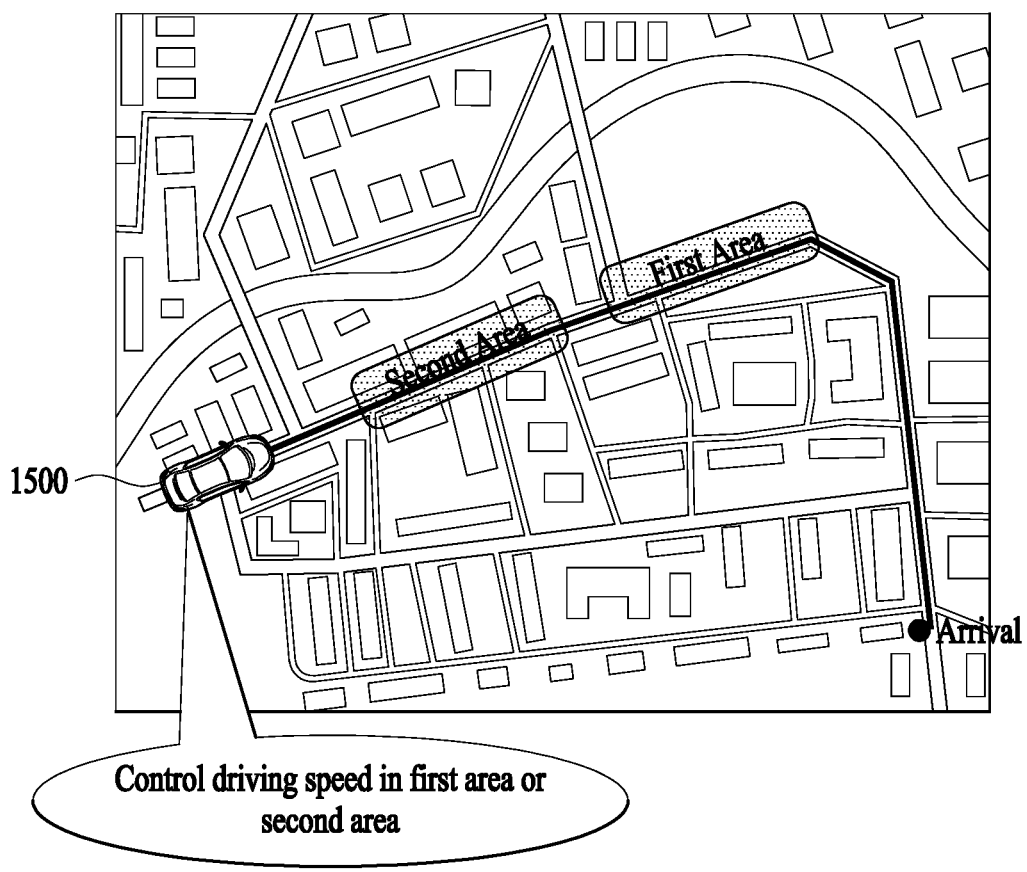
FIG. 15 shows an example in which a vehicle controls a driving speed based on a communication state of each area of a scheduled driving route.

FIG. 15 shows an example in which a vehicle controls a driving speed based on a communication state of each area of a scheduled driving route.

A vehicle 1500 may acquire information on a communication state of each of a first area and a second area of a scheduled driving route, and may acquire QoS requirement information for an application installed in the vehicle 1500.

The vehicle 1500 may determine, based on the acquired information, that the communication state of the first area fails to meet a QoS requirement for the application, and accordingly, the vehicle 1500 may increase a driving speed of the vehicle 1500 in the first area. For example, the vehicle 1500 may increase a driving speed thereof by taking into account real-time traffic information and speed limit information of the first area. Accordingly, the vehicle 1500 may pass through the first area at a high speed, thereby minimizing interruption or latency of a service provided through the application.

In addition, the vehicle 1500 may determine that a communication state of the second area preceding the first area meets the QoS requirement for the application, and accordingly, the vehicle 1500 may determine to increase a buffer size to be allocated to the application in the second area. In this case, in order to secure a buffering time for the application, the vehicle 1500 may reduce a driving speed thereof in the second area. Accordingly, the vehicle 1500 may pass through the second area at a low speed, thereby securing a sufficient amount of data necessary to provide a service in the first area.

Figure 16:
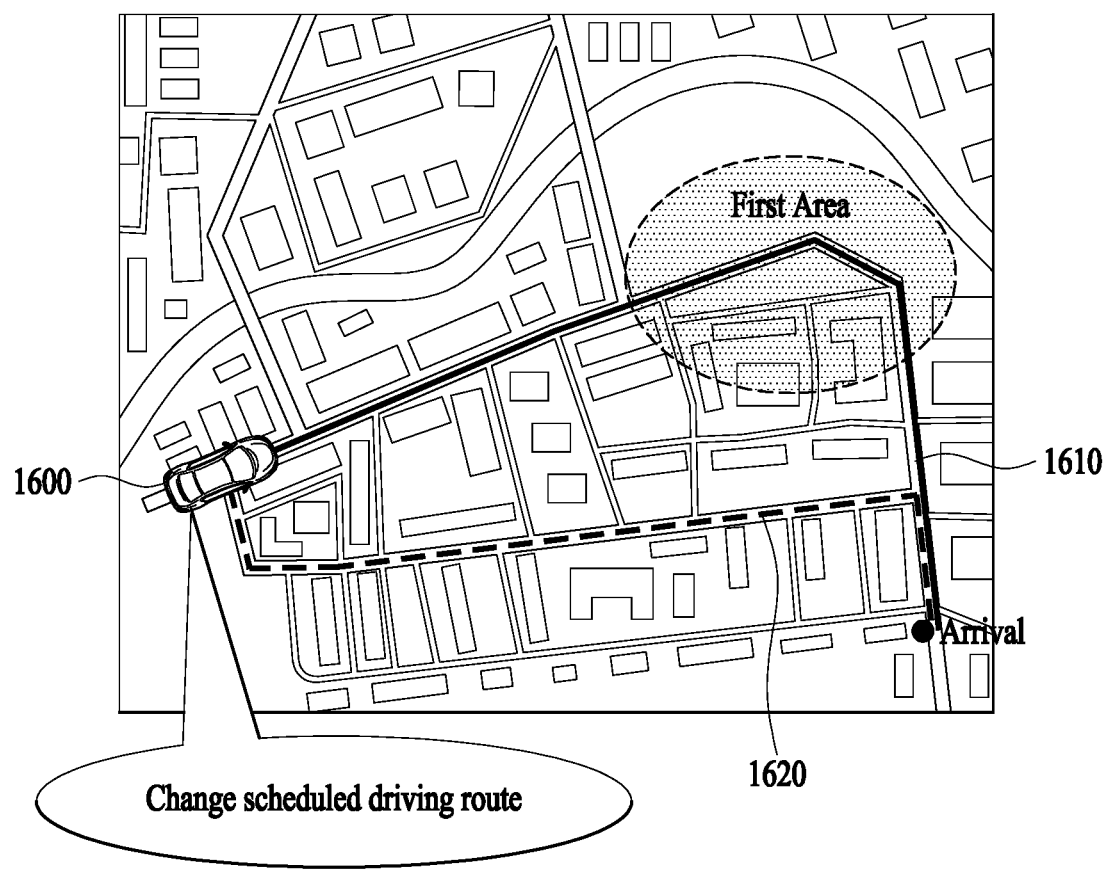
FIG. 16 shows an example in which a vehicle changes a scheduled driving route based on a communication state of each area of the scheduled driving route.

FIG. 16 shows an example in which a vehicle changes a scheduled driving route based on a communication state of each area of the scheduled driving route.

A vehicle 1600 may acquire information on a communication state of a first area of a scheduled driving route 1610, and QoS requirement information for an application installed in the vehicle 1600.

Based on the acquired information, the vehicle 1600 may determine that the communication state of the first area of the scheduled driving route 1610 fails to meet a QoS requirement for the application. Then, the vehicle 1600 may change the scheduled driving route such that the vehicle 1600 does not drive in the first area. Specifically, since the scheduled driving route 1610 includes the first area, the vehicle 1600 may change a scheduled driving route to a destination from the scheduled driving route 1610 to a new scheduled driving route 1620. Accordingly, the vehicle 1600 may drive along the new scheduled driving route 1620 without interruption or latency of a service provided through the application.

The vehicle 1600 may provide a passenger with a guidance indicating that the scheduled driving route has been changed and a guidance indicating that an estimated time of arrival can increase by a predetermined time period in case of driving along the changed scheduled driving route. In addition, before changing the scheduled driving route, the vehicle 1600 may inquire as to whether a user wishes to change the scheduled driving route, and may change or maintain the scheduled driving route depending on a selection of the user.

Figure 17:
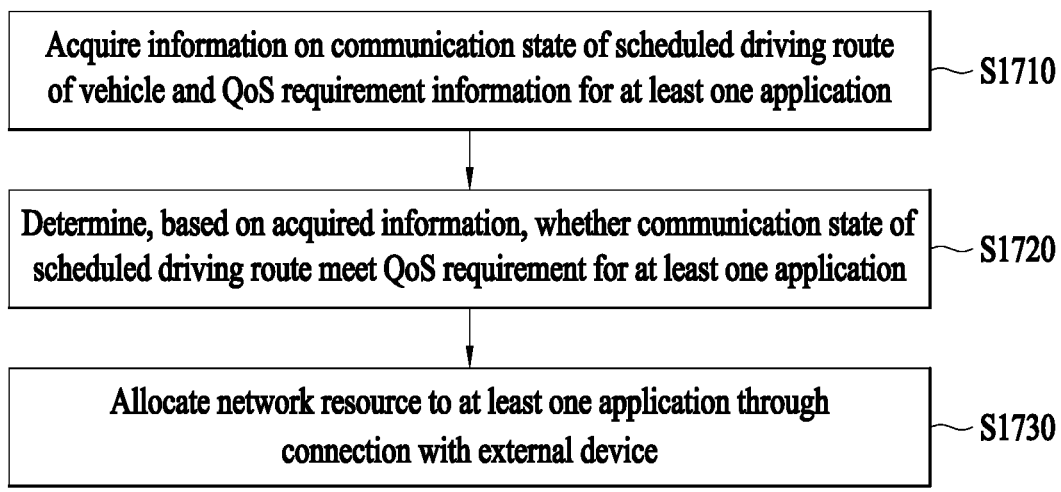
FIG. 17 shows a flowchart of how a terminal of a vehicle according to another embodiment operates.

FIG. 17 shows a flowchart of how a terminal of a vehicle according to another embodiment operates.

In step S1710, a terminal 800 may acquire information on a communication state of a scheduled driving route of a vehicle and QoS requirement information for each of at least one application. The step S1710 corresponds to the step S901 of FIG. 9 and thus a redundant description is herein omitted.

In step S1720, the terminal 800 may determine, based on the information acquired in the step S1710, whether the communication state of the scheduled driving route meets a QoS requirement for the at least one application. The step S1720 corresponds to the step S903 of FIG. 9 and thus a redundant description is herein omitted.

In step S1730, the terminal 800 may allocate a network resource to at least one application through connection to an external device based on a result of the determination made in the step S1720. Specifically, when the communication state of the scheduled driving route of the vehicle fails to meet a QoS requirement for the at least one application, the terminal 800 may additionally allocate a network resource to the at least one application through communication connection to the external device.

In one embodiment, when a communication state of a first area the scheduled driving route of the vehicle fails to meet the QoS requirement for the at least one application, the terminal 800 may additionally allocate a network resource to the at least one application. Specifically, when a total bandwidth necessary for a plurality of applications exceed a bandwidth available in the first area, the terminal 800 may allocate an additional bandwidth secured through vehicle-to-vehicle (V2V) communication with a nearby vehicle in the first area to the plurality of applications. In other words, the terminal 800 may share a bandwidth with the nearby vehicle through the V2V communication in the first area. For example, in case of performing vehicle platooning operation together with the nearby vehicle, the terminal 800 may share a bandwidth with the nearby vehicle and thereby additionally allocate a bandwidth to the application.

In another embodiment, when the communication state of the first area the scheduled driving route of the vehicle fails to meet the QoS requirement for the at least one application, the terminal 800 may additionally allocate a network resource to the at least one application through connection to a mobile device provided in the vehicle. Specifically, when a total bandwidth necessary for a plurality of applications exceed a bandwidth available in the first area, the terminal 800 may additionally allocate a bandwidth to the plurality of applications through communication with a mobile device of a passenger in the first area. For example, through communication with the mobile terminal of the passenger, the terminal 800 may additionally allocate a bandwidth to an application that does not provide a real-time service among the plurality of applications.

Figure 18:
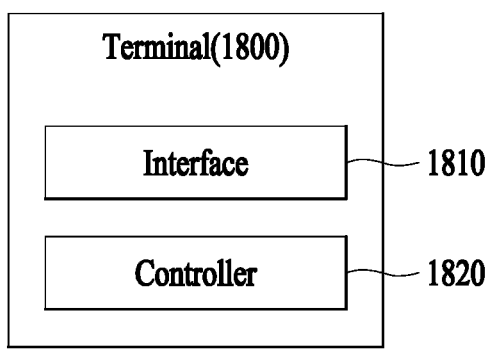
FIG. 18 shows a block diagram of a terminal of a vehicle.

FIG. 18 shows a block diagram of a terminal of a vehicle.

A terminal 1800 may be a device disposed in a vehicle and configured to manage at least one application installed in the vehicle. In addition, the terminal 1800 may be a device for assisting driving of the vehicle. According to an embodiment, the terminal 1800 may include an interface 1810 and a controller 1820. FIG. 8 shows only elements of the terminal 1800 related to the present embodiment. Therefore, those of ordinary skill in the technical field related to the present embodiment will appreciate that general-use elements other than the elements shown in FIG. 18 may be further included.

The interface 1810 may acquire information on a communication state of a scheduled driving route of the vehicle, and QoS requirement information for each of at least one application. The interface 1810 may acquire information on a communication state of each area of the scheduled driving route through a communication unit of the vehicle. A communication technologies employed by the communication unit may be Global System for Mobile (GSM) communication, Code Division Multi ACC (CDMA) system, Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), etc. According to an embodiment, the interface 1810 may acquire, from the at least one application installed in the vehicle, QoS requirement information for each of the at least one application.

The controller 1820 may control overall operations of the terminal 1800 and process data and signals. The controller 1820 may be configured as at least one hardware unit. In addition, the controller 1820 may operate by one or more software modules that are generated in execution of a program code stored in a memory.

The controller 1820 may identify a network resource to be allocated to at least one application on the scheduled driving route, based on the information acquired by the interface 1810, and may control an operation of the at least one application based on the identification. Specifically, the controller 1820 may determine whether a communication state of a first area of the scheduled driving route meets a QoS requirement for the at least one application and may identify, based on a result of the determination, a network resource to be allocated to the at least one application in the first area.

The controller 1820 may determine whether a total bandwidth necessary for the at least one application exceeds a bandwidth available in the first area of the scheduled driving route. When it is determined that the total bandwidth necessary for the at least one application exceeds the bandwidth available in the first area of the scheduled driving route, the controller 1820 may make an adjustment such that a bandwidth to be allocated to a first application among the at least one applications is reduced by changing a service level of the first application in the first area.

The controller 1820 may determine whether latency expected upon operation of the first application among the at least one application in the first area of the scheduled driving route exceeds allowable latency of the first application. When it is determined that the latency expected upon operation of the first application among the at least one application in the first area of the scheduled driving route exceeds the allowable latency of the first application, the controller 1820 may make an adjustment, such that a buffer size to be allocated to the first application in a second area preceding the first area within the scheduled driving route is increased.

The controller 1820 may determine whether the communication state of the first area of the scheduled driving route meets a QoS requirement for the at least one application, and may control driving of the vehicle based on a result of the determination. Specifically, when it is determined that the communication state of the first area of the scheduled driving route fails to meet the QoS requirement for the at least one application, the controller 1820 may change the scheduled driving route such that the vehicle does not drive in the first area and may control the vehicle such that the vehicle drives along the changed scheduled driving route.

The controller 1820 may determine whether the communication state of the first area of the scheduled driving route meets the QoS requirement for the at least one application. Based on a result of the determination, the controller 1820 may allocate a network resource to at least one application through connection with an external device in the first area.

The devices in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer readable recording medium as computer readable codes or program commands which may be executed by the processor. Here, the computer readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer readable recording medium may be dispersed to computer systems connected by a network so that computer readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors.

In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

What is claimed is:

1. An operation method of a terminal of a vehicle, the method comprising:
    acquiring information on a communication state of a scheduled driving route of the vehicle, and Quality of Service (QoS) requirement information for each of at least one application;
    identifying a network resource to be allocated to the at least one application in the scheduled driving route based on the acquired information; and
    controlling an operation of the at least one application based on the identification,
    wherein the acquiring comprises acquiring information on a communication state of a first area of the scheduled driving route, and
    wherein the identifying comprises:
        determining whether a total bandwidth necessary for the at least one application exceeds a bandwidth available in the first area; and
        when it is determined that the total bandwidth necessary for the at least one application exceeds the bandwidth available in the first area, making an adjustment such that a bandwidth to be allocated to a first application among the at least one application is reduced by changing a service level of the first application in the first area.

2. The method of claim 1,
    wherein the identifying comprises:
        determining whether the communication state of the first area of the scheduled driving route meets a QoS requirement for the at least one application; and
        based on a result of the determination, identifying a network resource to be allocated to the at least one application in the first area.

3. The method of claim 1, wherein the making of the adjustment comprises selecting the first application from among the at least one application by taking into account a priority of the at least one application.

4. The method of claim 1,
    wherein the identifying comprises:
        determining whether latency expected upon operation of a second application among the at least one application in the first area exceeds allowable latency of the second application; and
        when it is determined that the latency expected upon operation of the second application among the at least one application in the first area exceeds the allowable latency of the second application, making an adjustment such that a buffer size to be allocated to the second application in a second area preceding the first area within the scheduled driving route is increased.

5. The method of claim 1,
    wherein the identifying comprises determining whether the communication state of the first area meets a QoS requirement for the at least one application, and
    wherein the method further comprises, controlling driving of the vehicle based on a result of the determination.

6. The method of claim 5, wherein the controlling of the driving of the vehicle comprises, when it is determined that the communication state of the first area fails to meet the QoS requirement for the at least one application, controlling the vehicle such that the vehicle drives at a high speed in the first area.

7. The method of claim 6,
wherein the acquiring further comprises acquiring information on a communication state of a second area preceding the first area within the scheduled driving route, and
wherein the controlling of the driving of the vehicle comprises, when the communication state of the second area meets the QoS requirement for the at least one application, controlling the vehicle such that the vehicle drives at a low speed in the second area.

8. The method of claim 5, wherein the controlling of the driving of the vehicle comprises:
when it is determined that the communication state of the first area fails to meet the QoS requirement for the at least one application, changing the scheduled driving route such that the vehicle does not drive in the first area; and
controlling the vehicle such that the vehicle drives along the scheduled driving route that has been changed.

9. The method of claim 1,
wherein the identifying comprises determining whether the communication state of the first area meets a QoS requirement for the at least one application, and
wherein the method further comprises allocating, based on a result of the determination, a network resource to the at least one application through connection with an external device in the first area.

10. The method of claim 9, wherein the allocating comprises additionally allocating a bandwidth to the at least one application through vehicle-to-vehicle (V2V) communication with a nearby vehicle in the first area.

11. The method of claim 9, wherein the allocating further comprising additionally allocating a bandwidth to the at least one application through connection with a mobile device provided in the vehicle in the first area.

12. A non-transitory tangible computer-readable recording medium in which a program for implementing the method of claim 1 in a computer is recorded.

13. A terminal of a vehicle, comprising:
an interface configured to acquire information on a communication state of a scheduled driving route and Quality of Service (QoS) requirement information for each of at least one application; and
a controller configured to:
based on the acquired information, identify a network resource to be allocated to the at least one application on the scheduled driving route; and
control an operation of the at least one application based on the identification,
wherein the interface is configured to acquire information on a communication state of a first area of the scheduled driving route, and
wherein the controller is configured to:
determine whether a total bandwidth necessary for the at least one application exceeds a bandwidth available in the first area; and
when it is determined that the total bandwidth necessary for the at least one application exceeds the bandwidth available in the first area, make an adjustment such that a bandwidth to be allocated to a first application among the at least one application is reduced by changing a service level of the first application in the first area.

14. The terminal of claim 13,
wherein the controller is configured to:
determine whether the communication state of the first area of the scheduled driving route meets a QoS requirement for the at least one application; and
based on a result of the determination, identify a network resource to be allocated to the at least one application in the first area.

15. The terminal of claim 13,
wherein the controller is configured to:
determine whether latency expected upon operation of a second application among the at least one application in the first area exceeds an allowable latency of the second application; and
when it is determined that the latency expected upon the operation of the second application exceeds the allowable latency of the second application, make an adjustment such that a buffer size to be allocated to the second application in a second area preceding the first area within the scheduled driving route is increased.

16. The terminal of claim 13,
wherein the controller is configured to:
determine whether the communication state of the first area meets a QoS requirement for the at least one application; and
control driving of the vehicle based on a result of the determination.

17. The terminal of claim 16, wherein the controller is configured to:
when it is determined that the communication state of the first area fails to meet the QoS requirement for the at least one application, change the scheduled driving route such that the vehicle does not drive in the first area; and
control the vehicle such that the vehicle to drive along the scheduled driving route that has been changed.

18. The terminal of claim 13,
wherein the controller is configured to:
determine whether the communication state of the first area meets the QoS requirement for the at least one application; and
based on a result of the determination, allocate a network resource to the at least one application through connection with an external device in the first region.

* * * * *